United States Patent [19]

Westwood

[11] Patent Number: 5,096,150
[45] Date of Patent: * Mar. 17, 1992

[54] CLAMP DEVICE

[76] Inventor: Samuel M. Westwood, 2005 Linden St., Bethlehem, Pa. 18017

[*] Notice: The portion of the term of this patent subsequent to Oct. 27, 2004 has been disclaimed.

[21] Appl. No.: 112,186

[22] Filed: Oct. 26, 1987

Related U.S. Application Data

[63] Continuation-in-part of Ser. No. 676,108, Nov. 29, 1984, Pat. No. 4,702,447.

[51] Int. Cl.[5] .................................... F16M 13/00
[52] U.S. Cl. ......................... 248/231.5; 248/316.5; 403/157
[58] Field of Search ............ 248/540, 541, 316.5, 248/231.5; 24/232 R, 241 PI, 241 R, 241 PP; 403/157

[56] References Cited

U.S. PATENT DOCUMENTS

| | | | |
|---|---|---|---|
| 340,838 | 4/1886 | Walters et al. | 24/232 X |
| 483,963 | 10/1892 | Leger | 248/316.5 X |
| 2,057,980 | 10/1936 | Ringzelli | 248/231.5 X |
| 2,537,322 | 1/1951 | Wanzenberg | 24/136 B |
| 2,543,550 | 2/1951 | Kneeland . | |
| 2,589,520 | 3/1952 | Wallenius . | |
| 2,824,913 | 2/1958 | Taylor . | |
| 2,838,263 | 6/1958 | Drewrys | 248/231.5 X |
| 2,917,800 | 12/1959 | Gee . | |
| 3,220,494 | 9/1966 | Holmes | 24/232 X |
| 4,066,232 | 1/1978 | Hermeyer | 248/231.5 |
| 4,240,604 | 12/1980 | Brach | 248/316.5 |
| 4,309,052 | 1/1982 | Drayton | 24/241 PP X |
| 4,327,608 | 5/1982 | Keys . | |
| 4,702,447 | 10/1987 | Westwood, III | 248/231.5 X |

FOREIGN PATENT DOCUMENTS

| | | | |
|---|---|---|---|
| 288756 | 11/1915 | Fed. Rep. of Germany | 24/232 |
| 1065482 | 9/1959 | Fed. Rep. of Germany | 248/231.5 |
| 441870 | 1/1968 | Switzerland | 248/231.5 |
| 9917 | 8/1886 | United Kingdom | 24/232 |

OTHER PUBLICATIONS

Workbench, Nov.-Dec. 1978, p. 92-95.

*Primary Examiner*—David L. Talbott
*Attorney, Agent, or Firm*—Fleit, Jacobson, Cohn, Price, Holman & Stern

[57] ABSTRACT

A clamp device adapted to clampingly engage items for support or connection of such items to another device or to clampingly engage a support or item for connection therewith having the clamping component constructed of plastic material capable of being injection molded and utilizing a "living hinge" connecting the pivotal clamp components to a main body portion of the clamp device with the plastic material optionally incorporating memory characteristics so that the clamping components or jaws will flex back to their originally molded open or closed positions. The clamp device also may be provided with interchangeable jaws or clamp components to enable effective size variation in the area to be embraced or encompassed by the clamping components or jaws. The clamp device also may be a vibration proof clamp associated with a thumb nut type actuating nut in the form of a ratchet arrangement to secure the clamping nut in adjusted position to prevent it from loosening due to vibration. Another variation of the clamp device includes a clamp structure that does not utilize the memory characteristics of the plastic but is provided with a separate spring to cause the jaws or clamping component to move to a desired position when not actuated by the clamping nut.

7 Claims, 1 Drawing Sheet

CLAMP DEVICE

CROSS-REFERENCE TO RELATED APPLICATION

This application is a continuation-in-part of my pending application Ser. No. 676,108 filed Nov. 29, 1984 for CLAMP DEVICE to be issued as U.S. Pat. No. 4,702,447 on Oct. 27, 1987.

BACKGROUND OF THE INVENTION

1. Field of the Invention

The present invention generally relates to a clamp device adapted to clampingly engage items for support or connection of such items to another device or to clampingly engage a support or item for connection therewith having the clamping component constructed of plastic material capable of being injection molded and utilizing a "living hinge" connecting the pivotal clamp components to a main body portion of the clamp device with the plastic material optionally incorporating memory characteristics so that the clamping components or jaws will flex back to their originally molded open or closed positions. The clamp device also may be provided with interchangeable jaws or clamp components to enable effective size variation in the area to be embraced or encompassed by the clamping components or jaws. The clamp device also may be a vibration proof clamp associated with a thumb nut type of actuating nut in the form of a ratchet arrangement to secure the clamping nut in adjusted position to prevent it from loosening due to vibration. Another variation of the clamp device includes a clamp structure that does not utilize the memory characteristics of the plastic but is provided with a separate spring to cause the jaws or clamping components to move to a desired position when not actuated by the clamping nut.

2. Information Disclosure Statement

Various types of clamping devices are well-known including those cited in the parent application. A separate information disclosure statement will be filed.

SUMMARY OF THE INVENTION

An object of the present invention is to provide a clamp device which includes a main body portion and a pair of clamp components or jaws pivotally attached thereto with the main body including a threaded stem and a threaded thumb nut thereon which engages the jaws to force them into clamping engagement with an entity disposed between the jaws with the jaws being connected to the main body portion through a "living hinge" with the main body, jaws and hinge being of one piece plastic material capable of being injection molded with such plastic material being polyethylene or similar plastic material having the capability of withstanding multiple flexings and having memory characteristics so that the jaws or clamp components will return to their molded open or closed positions when the thumb nut is threaded to a position out of engagement with the jaws or clamp components.

Another object of the invention is to provide a clamp device in accordance with the preceding object in which the clamp components or jaws are interchangeable with other similar jaws of various sizes to enable the size characteristics of the clamping components or jaws to be varied depending upon the use requirements encountered.

A further object of the invention is to provide a clamp device that is vibration proof by introducing a ratchet mechanism associated with the clamp nut and the remainder of the clamp device to prevent rotation of the clamp nut toward an unclamping position due to vibrations or other incidental forces thereby maintaining the clamp device in secure clamping position.

Still another object of the invention is to provide a clamp device constructed in a manner to connect the clamp components or jaws to a main body portion by pins rather than by a living hinge with a spring device being associated with the main body portion and jaws to bias the jaws to a desired position when the clamping nut is rotated to release the clamping force on the clamping components or jaws.

A still further object of the invention is to provide a clamp device in accordance with the preceding objects in which the clamping nut includes a laterally extending surface that engages the clamping components or jaws for biasing and moving the movable jaws toward each other with the point of engagement being disposed outwardly of the rotational center of the nut and in a position outwardly of the pivot axis of the jaws and generally in alignment with the outer edge of the laterally extending surface on the jaws to provide a maximum lever arm to the clamping force exerted on the clamping components or jaws.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
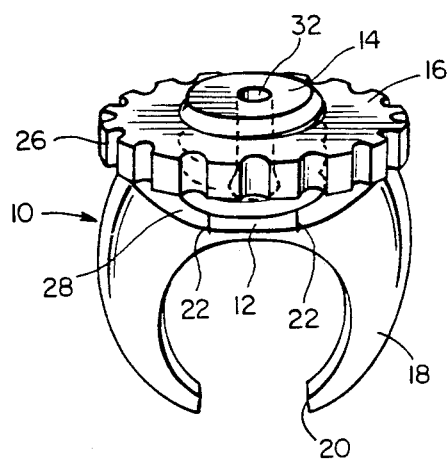
FIG. 1 is a perspective view of the clamp device of the present invention.
Figure 2:
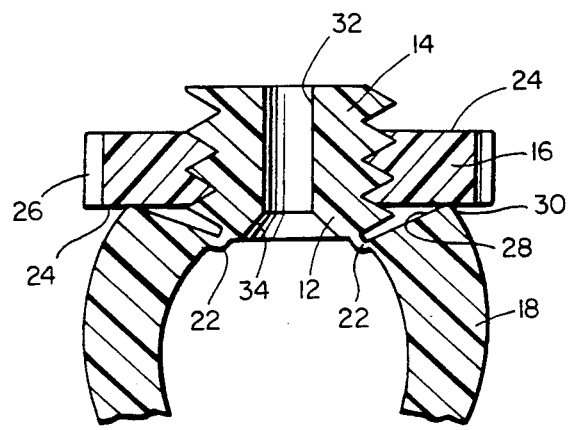
FIG. 2 is a sectional view of the clamp device of FIG. 1.

Referring now specifically to FIGS. 1 and 2 of the drawings, the clamp device illustrated therein is generally designated by reference numeral 10 and includes a main body portion 12 which includes an externally threaded stem 14 having a threaded clamping nut 16 threaded thereon for movement longitudinally on the stem. The main body portion 12 includes a pair of clamping components or jaws 18 for grippingly engaging an item, a plurality of items, a supporting surface or any other desired entity within or between the free end portions 20 of the jaws. The shape, size and configuration of the jaws may be varied depending upon the use requirements encountered.

The jaws 18 and main body portion 12 are constructed of unitary plastic material capable of being injection molded with the juncture between the jaws 18 and the main body portion 12 being relatively thin and forming a living hinge 22 of the same plastic material as the jaws and main body portion are formed so that the jaws may be flexed inwardly and outwardly many times without breakage of the hinges 22. Living hinges are well-known and the main body 12, jaws 18 and hinges 22 may be constructed of various plastic materials including polyethylene, Delrin or metal. The nut 16 includes flat surfaces 24 and a knurled or ribbed periphery 26. The jaws 18 have an upwardly facing top surface 28 which extends outwardly and terminates in an outer edge 30 that is engaged by the outer portion of the flat surface 24 to provide a maximum lever arm for the clamping force exerted on the jaws 18 to pivot the free end portions 20 towards each other in a manner similar to that disclosed in co-pending application Ser. No. 676,108. The main body portion 12 and stem 14 are provided with a longitudinal passageway 32 extending therethrough which may have an outward flared lower end 34 to receive a fastening device such as a threaded bolt, screw, or the like to secure the stem and main body to any supporting entity or any entity to be supported depending upon the manner of use of the clamp device. The passageway 32 may be internally threaded if desired to secure the stem to a supporting surface by a screw threaded member secured to or extending through the supporting surface or for connection with any articles or entities having a screw threaded member associated therewith.

Figure 3:
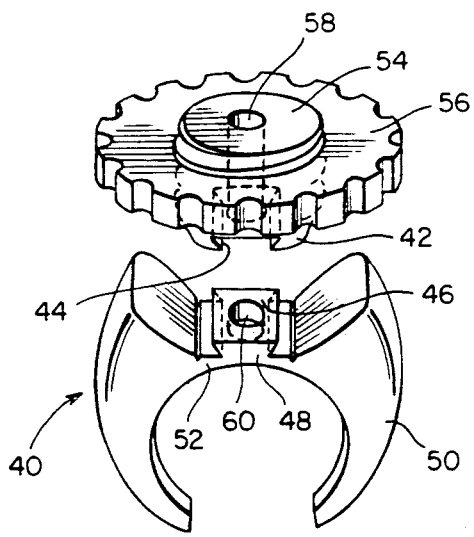
FIG. 3 is a perspective view of a clamp device using interchangeable jaw structures.

FIG. 3 illustrates a modified form of the invention generally designated by reference numeral 40 in which the main body portion 42 is provided with a transversely extending dovetail recess 44 formed in the lower end thereof for interlockingly receiving a transversely extending projection 46 on a connecting member 48 between a pair of clamping jaws 50 which are connected to the connecting portion by living hinges 52. The main body 42 includes an externally threaded stem 54 receiving a clamping nut 56 thereon in the same manner as the embodiment illustrated in FIGS. 1 and 2 and both the stem and main body include a passageway 58 and a similar passageway 60 is provided in the projection 46 and connecting portion 48 for receiving supporting or connecting fastening arrangements and the like. The dovetail projection and dovetail recess may be tapered laterally for positive interlocking connection or the fit between these components may be such that when the projection 46 is slid laterally into the recess, the two components will be securely interlocked. This construction enables interchange of jaws 50 with other jaws having the same connecting portion and projection but different size or configuration characteristics thereby increasing the versatility of use of the clamp device. For example, the interchangeable jaws perform a clamping diameter of various sizes depending upon the number of items to be held or depending upon the supporting characteristics of a support or the like. Thus, the interchangeable jaw enables the clamp device to be used with various shapes, sizes and configurations of clamp jaws which function in the same manner as those illustrated in FIGS. 1 and 2.

Figure 4:
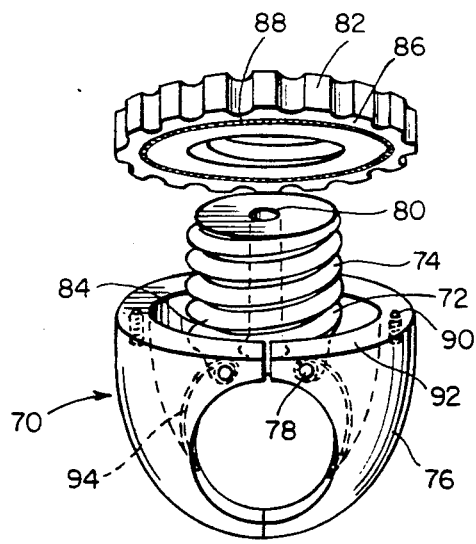
FIG. 4 is a perspective view of another embodiment of the clamp device which is vibration proof and which includes spring devices to bias the jaws to a desired position.

FIG. 4 illustrates another embodiment of the clamp device designated by reference numeral 70 which includes a main body portion 72 having an externally threaded cylindrical stem 74 forming a portion thereof and a pair of jaws 76 pivoted to the main body portion 72 by hinge pins 78. The main body portion 72 includes a passageway 80 in a manner similar to the embodiments illustrated in FIGS. 1-3 and a clamp nut 82 is threaded onto the stem 74 in a similar manner to cooperate with the jaws 76. In this embodiment of the invention, the stem 74 where it joins with the reduced thickness main body portion 72 includes a shoulder 84 which limits the outward pivotal movement of the jaws 76 thus, in effect, forming a stop for the jaws. Also, the flat surface 86 on the nut 82 which faces the jaws includes a plurality of pockets or serrations 88 which are associated with spring loaded ball detents 90 in the upper surfaces 92 of the jaws 76 so that when the jaws 76 are in clamping relation, the spring loaded detent 90 will engage the pockets or recesses 88 to lock the thumb nut 82 in adjusted position thereby preventing vibration or other incidental forces to cause rotation of the thumb nut 82 in a direction that would loosen the jaws 76.

As an additional feature that may be incorporated into the vibration proof clamp device of FIG. 4 or used with that type of clamp device without the vibration proof feature is the use of a wire spring 94 which biases the jaws to their open position when pressure is released from the top of the jaws by the thumb screw nut 82 being loosened.

While two movable jaws are illustrated in each embodiment of the invention, it is pointed out that, in some instances, only a single movable jaw is provided and, in other instances, more than two movable jaws may be provided. In any event, the jaw or jaws are connected to one end of the stem for pivotal movement and the thumb nut is provided to bias the jaw or jaws to a clamping position with the jaws being connected with or engaged with an entity to be supported or a supporting entity. The stem is provided with the passageway, aperture or other means for connection with one of the supported entities or entities to be supported. The internally threaded nut is independent of the supporting means on the stem and each pivotal jaw includes a surface 28 which extends laterally of the pivot axis of the jaw with the diameter of the nut oriented with the outer periphery thereof being at least in alignment with the outer edge of the laterally extending surface thereby providing a maximum lever arm to the force exerted on the outer edge of the laterally extending surface on the pivoting jaws to exert maximum clamping force onto the jaws for moving the free end portions of the jaws towards each other thereby applying maximum clamping torque or force to the movable jaw or jaws thus applying maximum locking force to the movable jaw or jaws when the jaw or jaws are in the fully clamped or closed position.

The thin living hinge of plastic, metal or other material may the used or the thicker memory hinge of plastic or other material may be used.

The foregoing is considered as illustrative only of the principles of the invention. Further since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A clamp device for interconnecting two entities comprising a longitudinally extending stem, a pair of jaws connected to one end of the stem with at least one of the jaws being movable in relation to the stem and the other of the jaws, means on the stem movable into engagement with the jaws to position the jaws in connecting engagement with one of the entities, and means on the stem for connection with the other of the entities, said means engaging the jaws including an internally threaded nut mounted on an externally threaded portion of the stem and being independent of the means on the stem for connection with the other of the entities, said movable jaw including a surface extending laterally of the pivot axis of the jaw engageable by the nut to exert rotational force thereon for pivoting the movable jaw toward the other jaw, said nut having a diameter whereby the periphery of the nut is disposed outwardly at least sufficiently to be substantially in alignment with the outer edge of the laterally extending surface at its maximum lever arm relationship to the pivot axis for moving the movable jaw toward engagement with one of the entities to apply maximum torque and clamping force to the movable jaw and apply maximum locking force to the movable jaw when in clamped position, said stem and jaws being of unitary plastic construction with the movable jaw being connected to the stem by a living hinge.

2. The clamp device as defined in claim 1 wherein said hinge includes memory characteristics to return the jaws to a formed position.

3. The clamp device as defined in claim 2 wherein said stem and jaws and the hinge are formed by injection molding.

4. The structure as defined in claim 1 wherein said stem and jaws include abutting surfaces to limit the opening movement of the jaws.

5. The clamp device as defined in claim 1 wherein said nut and jaws include interengaging means for securing the nut in adjusted position to prevent loosening of the nut by vibration.

6. The structure as defined in claim 1 wherein said jaws are biased to an open position by spring means.

7. A clamp device for interconnecting two entities comprising a longitudinally extending stem, a pair of jaws connected to one end of the stem with at least one of the jaws being movable in relation to the stem and the other of the jaws, means on the stem movable into engagement with the jaws to position the jaws in connecting engagement with one of the entities, and means on the stem for connection with the other of the entities, said movable jaw being mounted on the stem with a pivot pin to enable pivotal movement of the movable jaw, said means engaging the jaws including an internally threaded nut mounted on an externally threaded portion of the stem and being independent of the means on the stem for connection with the other of the entities, said pivotal jaw including a surface extending laterally of the pivot axis of the jaw engageable by the nut to exert rotational force thereon for pivoting the movable jaw toward the other jaw, said nut having a diameter whereby the periphery of the nut is disposed outwardly at least sufficiently to be substantially in alignment with the outer edge of the laterally extending surface at its maximum lever arm relationship to said pivot pin for moving the movable jaw toward engagement with one of the entities to apply maximum torque and clamping force to the movable jaw and apply maximum locking force to the movable jaw when in clamped position, and spring means associated with the pivot pin and the jaws and stem to bias the jaws toward open position when the nut is loosened.

* * * * *